United States Patent
Catherwood et al.

(10) Patent No.: US 9,858,083 B2
(45) Date of Patent: Jan. 2, 2018

(54) DUAL BOOT PANEL SWAP MECHANISM

(71) Applicant: Microchip Technology Incorporated, Chandler, AZ (US)

(72) Inventors: Michael I. Catherwood, Georgetown, TX (US); Brant Ivey, Chandler, AZ (US); Igor Wojewoda, Tempe, AZ (US); David Mickey, Chandler, AZ (US); Joseph Kanellopoulos, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 475 days.

(21) Appl. No.: 14/204,208

(22) Filed: Mar. 11, 2014

(65) Prior Publication Data

US 2014/0281465 A1    Sep. 18, 2014

Related U.S. Application Data

(60) Provisional application No. 61/780,990, filed on Mar. 14, 2013.

(51) Int. Cl.
*G06F 9/44* (2006.01)
*G06F 9/445* (2006.01)

(52) U.S. Cl.
CPC .............. *G06F 9/4401* (2013.01); *G06F 8/67* (2013.01); *G06F 9/441* (2013.01)

(58) Field of Classification Search
CPC ........... G06F 8/67; G06F 9/4401; G06F 9/441
See application file for complete search history.

(56) References Cited

U.S. PATENT DOCUMENTS 6,324,411 B1   11/2001  Genell ...................... 455/561
6,799,259 B1 *  9/2004  Reed, Jr. ............... G06F 21/80
                                                     711/112

(Continued)

FOREIGN PATENT DOCUMENTS

EP    2508990 A1    10/2012  ............. G06F 9/445
TW   200941344 A    10/2009  ............. G06F 9/445

OTHER PUBLICATIONS

International Search Report and Written Opinion, Application No. PCT/US2014/025329, 10 pages, dated Jul. 29, 2014.

(Continued)

*Primary Examiner* — Thomas Lee
*Assistant Examiner* — Mohammad A Rahman
(74) *Attorney, Agent, or Firm* — Slayden Grubert Beard PLLC

(57) ABSTRACT

A central processing unit with dual boot capabilities is disclosed comprising an instruction memory further comprising a first and second memory area which are configured to be individually programmable, wherein first and second memory area can be assigned to an active memory from which instructions are executed and an inactive memory, respectively. The instruction set for the central processing unit comprises a dedicated instruction that allows to perform a swap from the an active memory area to an inactive memory area, wherein the swap is performed by executing the dedicated instruction in the active memory followed by a program flow change instruction in the active memory, whereupon the inactive memory becomes the new active memory and the active memory becomes the new inactive memory and execution of instructions continues in the new active memory.

32 Claims, 6 Drawing Sheets

(56) References Cited

U.S. PATENT DOCUMENTS

| | | | | |
|---|---|---|---|---|
| 7,257,814 B1* | 8/2007 | Melvin | G06F 9/3004 | 710/200 |
| 2002/0103847 A1* | 8/2002 | Potash | G06F 9/544 | 718/107 |
| 2002/0103990 A1* | 8/2002 | Potash | G06F 9/3009 | 712/215 |
| 2005/0223384 A1* | 10/2005 | Klingman | G06F 9/4881 | 718/107 |
| 2009/0240934 A1 | 9/2009 | Chou | | 713/2 |
| 2010/0080557 A1* | 4/2010 | Ishida | H04L 41/0856 | 398/48 |
| 2010/0223452 A1* | 9/2010 | Chung | G06F 9/441 | 713/2 |
| 2010/0274773 A1* | 10/2010 | Pawar | G06F 12/0804 | 707/693 |
| 2012/0137108 A1* | 5/2012 | Koch, III | G06F 9/30018 | 712/200 |
| 2012/0151201 A1* | 6/2012 | Clerc | G06F 9/441 | 713/2 |
| 2012/0185673 A1* | 7/2012 | Yoo | G06F 8/447 | 712/30 |
| 2012/0297177 A1* | 11/2012 | Ghosh | G06F 21/53 | 713/2 |
| 2012/0299847 A1* | 11/2012 | Kwon | G06F 9/441 | 345/173 |
| 2013/0002725 A1* | 1/2013 | Kim | G06F 9/4445 | 345/684 |
| 2013/0103886 A1* | 4/2013 | Bhatia | G06F 13/12 | 711/103 |
| 2013/0318544 A1* | 11/2013 | Kuroda | G06F 9/54 | 719/320 |
| 2015/0019847 A1* | 1/2015 | Catherwood | G06F 9/462 | 712/229 |

OTHER PUBLICATIONS

Taiwan Office Action, Application No. 103109757, 11 pages, dated Jul. 11, 2017.
Taiwan Notice of Allowance, Application No. 103109757, 5 pages, dated Oct. 31, 2017.

* cited by examiner

501 ...
    ; Unlock software interlock
502 { MOV.b    #55, W0
     MOV.b    W0, NVMKEY
     MOV.b    #AA, W0
     MOV.b    W0, NVMKEY
    ; Execute bootswap instruction
503  BOOTSWP
504  BRA      startNew
     ...

505 ...
    ; Code block in second space
506 startNew:
    ...

Fig. 6

SOFTSWAP: Soft Swap Status bit
When dual boot enabled = 1;
1 = Panels have been successfully swapped using the BOOTSWP instruction
0 = Awaiting successful panel swap using the BOOTSWP instruction.

When dual boot enabled = 0 (BOOTSWP not possible):
Read as '0'

Fig. 7

P2ACTIV: Dual Boot Active Region Status
When dual boot enabled = 1;
1 = Panel 2 Flash is mapped into Active region
0 = Panel 1 Flash is mapped into Active region When dual boot enabled = 0 :
Read as '0'

Fig. 8

SWAPEN: Soft Swap Enable bit
When sec dual boot mode active = 1;
May be set by writing '1' twice within three cycles and remains set for two cycles.

DUAL BOOT PANEL SWAP MECHANISM

CROSS-REFERENCE TO RELATED APPLICATIONS

This application claims the benefit of U.S. Provisional Application No. 61/780,990 filed on Mar. 14, 2013, which is incorporated herein by reference in its entirety.

TECHNICAL FIELD

The present disclosure relates to a dual boot panel swap mechanism, in particular a dual boot panel swap mechanism providing for a live update for a microcontroller.

SUMMARY

According to various embodiments, a mechanism is provided to allow users to switch to a new code image without resetting the host device. Thus, the need to reset a host device may be eliminated and latency of switching to a new code image may be reduced to a few CPU cycles, for example when a firmware code update has been performed.

According to various embodiments, such properly configured host device may allow a customer to re-flash the device and switch to a new code image without halting execution of the application. This approach may be beneficial, for example, if the host device is employed in a real-time constrained application such as a switched mode power supply (SMPS) or a motor controller. This approach also allows the peripherals to continue running while the switch is taking place. Motor-control and switch mode power supply (SMPS) applications may especially benefit from continuous execution and peripheral operation during a re-flash of the host device.

According to various embodiments, a means may be provided within a microcontroller or processor to swap two code images within a device as part of regular instruction flow and fast as possible, without a reset, and with minimal impact to exception timing.

According to various embodiments, an inherent instruction (for example using the mnemonic BOOTSWP) is provided for a central processing unit (CPU) of a microcontroller or processor and associated mechanism to force a code image swap without the need to reset the device. According to some embodiments, the image swap may be temporary (e.g., the newly active image will not be selected after a device reset and the device will revert to the other image). According to certain embodiments, the image swap may be persistent (e.g., the newly active image will be selected after a device reset).

According to various embodiments, a central processing unit (CPU) may be provided with dual boot capabilities. The CPU may comprise an instruction memory further comprising a first and second memory area, which may be configured to be individually programmable. The first and second memory area may be assigned to an active memory from which instructions are executed and an inactive memory, respectively. The instruction set for the CPU may comprise a dedicated instruction that performs a swap from the an active memory area to an inactive memory area, wherein the swap may be performed by executing the dedicated instruction in the active memory followed by a program flow change instruction in the active memory, whereupon the inactive memory becomes the new active memory and the active memory becomes the new inactive memory and execution of instructions continues in the new active memory.

BRIEF DESCRIPTION OF THE FIGURES

FIG. 5 illustrates application source code for invoking the memory swap operation, according to certain embodiments.

FIG. 6 describes a status bit in a special function register, according to certain embodiments.

FIG. 7 describes a status bit in a special function register, according to certain embodiments.

FIG. 8 describes a control/status bit in a special function register, according to certain embodiments.

DETAILED DESCRIPTION

The execution of a software based switch of firmware images can be challenging at the application level. This approach may be pursued in very time sensitive applications.

Certain applications—called "Dual Boot"— need to execute from one code image (Active) while updating/re-flashing another code image (Inactive). One configuration allows for at least two separate memory areas (Panels) that may be selectively activated. In one "Dual Boot" configuration, an update to the Inactive Panel is followed by an application restart, during which time the "Dual Boot" mechanism will make the previously updated Inactive Panel become the new Active Panel. Code execution will then commence from the newly activated panel. The host device selects the Active Panel after examining a sequence number (e.g., set in nonvolatile memory). A reset sequence of this nature may require tens of milliseconds of downtime during which time the application is not executing or is at least not fully functional.

There exists a need to re-flash/update applications with new code while continuing to execute existing application code (e.g., Dual Boot capability). Furthermore there exists a need to switch to the updated code image without the delays associated with a device reset, particularly for applications that are very time sensitive.

Figure 1:
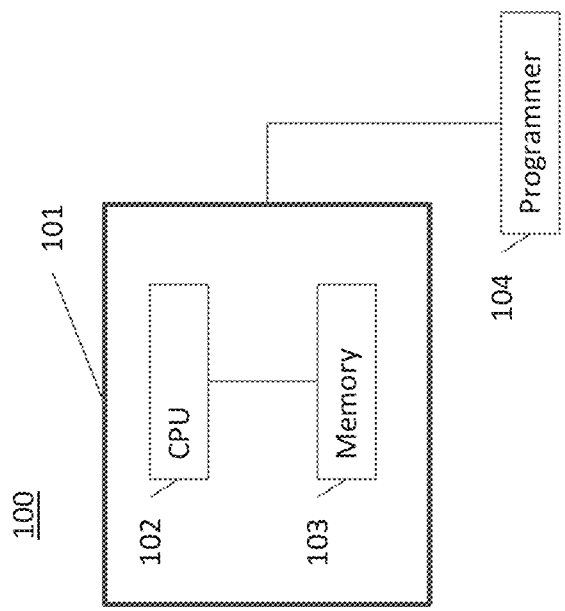
FIG. 1 illustrates a microcontroller-based system, according to certain embodiments.

FIG. 1 illustrates microcontroller-based system 100, according to certain embodiments. System 100 comprises microcontroller 101—which further comprises central processing unit (CPU) 102 and memory 103—and programmer 104. System 100 may be, for example, a switched mode power supply (SMPS) controller or a motor controller. Microcontroller 101 may be, for example, a model within MICROCHIP's dsPIC/PIC24 families of microcontrollers with a processing core, one or more register files, on-board random access memory (RAM), one or more power management modes, integral analog comparator and/or analog-to-digital converter, and on-chip controllers for standard input/output protocols such as Universal Serial Bus and IEEE Std. 1149.1 (JTAG). Memory 103 may be non-volatile memory such as flash memory or electrically erasable programmable read-only memory (EEPROM). Programmer 104 may be an externally attachable computer system that provides new instructions and/or data to be stored in memory 103. Programmer 104 may connect via a serial connection such as a universal serial bus (USB) connection.

CPU 102 executes programs stored in memory 103 by fetching instructions and/or data from memory 103 and executing those instructions. CPU 102 may be, e.g., a reduced instruction set processor or a complex instruction set processor. Each instruction executed by CPU 102 may include an operation code and zero or more operands. Data and addresses may be encoded into instructions or may be retrieved from one or more registers. The result of an instruction may be stored to, e.g., a register, RAM, or memory 103.

Memory 103 may be randomly accessible, meaning that any unit of data can be read in a single read cycle. Memory 103 may be block accessible, meaning that a read request for a byte of data may require an internal read of a block of data, e.g., 512 bytes, into a buffer. In some embodiments, a write to an empty memory location may be immediate (e.g., within single write cycle). In some embodiments, a write to a memory location containing data may require a block erase before the write may proceed.

Figure 2:
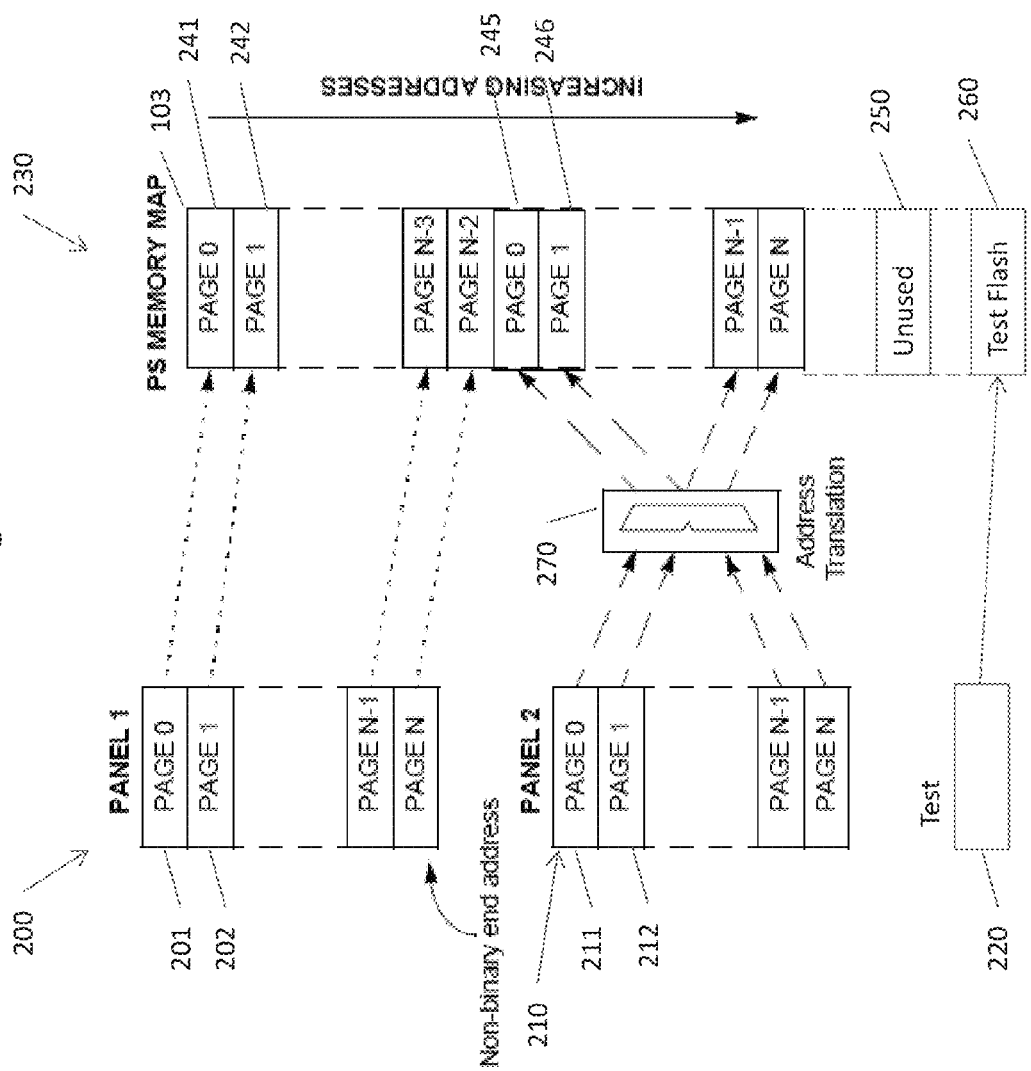
FIG. 2 illustrates a memory layout, according to certain embodiments.

FIG. 2 illustrates a memory layout of memory 103, according to certain embodiments. Memory 103 may be viewed in logical terms as two or more panels 200 and 210 and test area 220. Each panel 200 or 210 may comprise an integer number of contiguous logical pages of memory identified as 201, 202, 211, and 212. Memory map 230 illustrates the mapping of logical pages to physical pages (e.g., physical pages 241-246) of memory 103. Memory map 230 may comprise unused physical pages 250 and test pages 260. Microcontroller 101 may further comprise address translation module 270.

Logical pages 201, 202, 211 and 212 map to and are backed by memory in physical pages 241, 242, 245, and 246, respectively.

Microcontroller 101 may execute instructions (and may read data) from the active panel when executing an application. If the active panel is panel 200 (i.e., PANEL1), microcontroller 101 may fetch an instruction from logical page 201, which results in a memory read from physical page 241. The fetched instruction may be a load instruction referencing an address in logical page 202. When microcontroller 101 executes the load instruction, microcontroller 101 will read the value from logical page 202, which results in a memory read from physical page 242 of memory 103. If the active panel is panel 210 (i.e., PANEL2), a fetch by microcontroller 101 from logical page 211 would result in a read from physical page 245.

In certain embodiments, a portion of memory 103 may be unused resulting in one or more unused physical pages 250. In certain embodiments, a portion of memory 103 may contain test instructions and/or data. This test portion may be identified by logical test region 220 that maps to physical pages 260. The test portion may include routines and/or data for calibrating peripheral devices, verifying system or component operation, and debugging application code.

In certain embodiments, address translation module 270 provides a translation of logical addressing to physical addressing. In certain embodiments, address translation module 270 may be a multiplexer/demultiplexer that selects one or more banks of physical memory 103 based on an indicator of the active panel. In certain embodiments, address translation module 270 may be a translation lookaside buffer (TLB) that provides logical to physical address translations.

Figure 3:
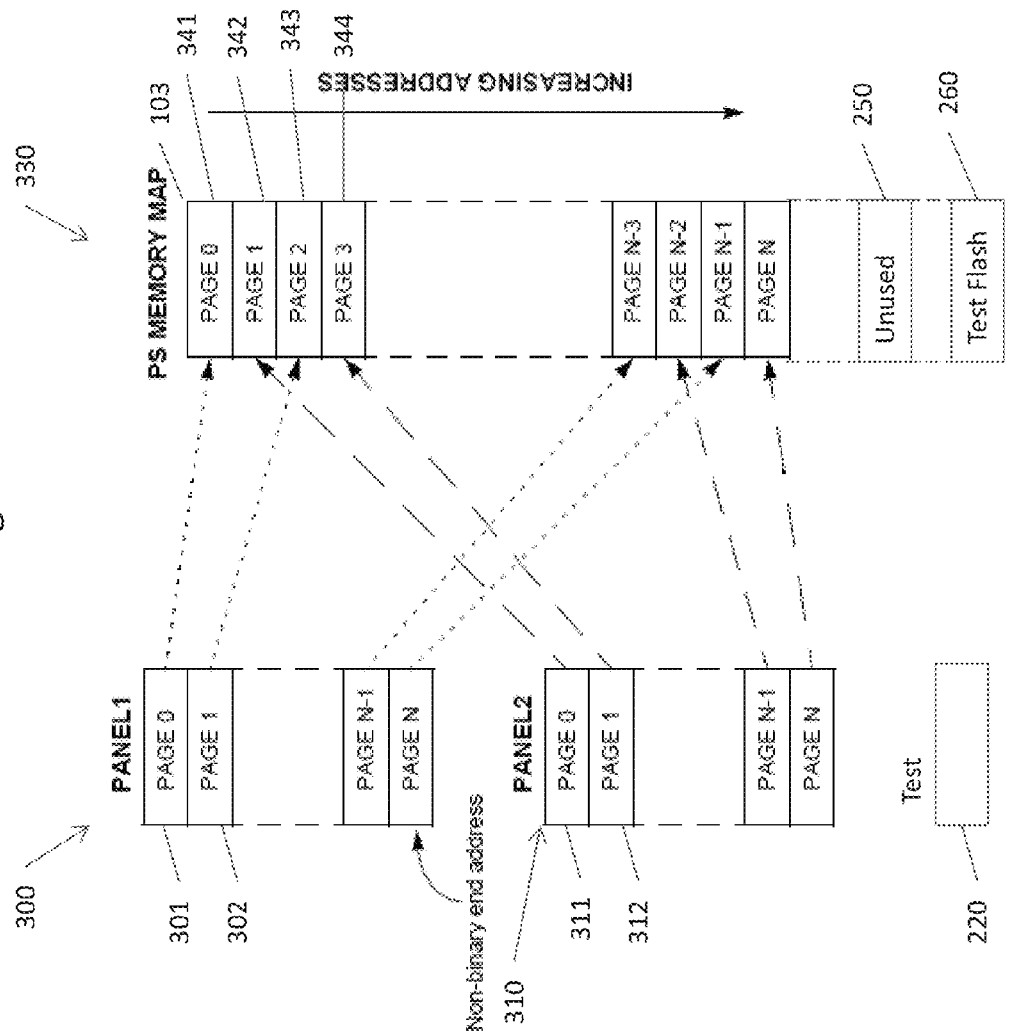
FIG. 3 illustrates another memory layout, according to certain embodiments.

FIG. 3 illustrates a memory layout of memory 103, according to certain embodiments. In the configuration of FIG. 3, logical panels 300 and 310 map to memory 103 as illustrated in memory map 330. Logical panels 300 and 310 may comprise an integer number of contiguous logical pages of memory identified as 301, 302, 311, and 312. Memory 103 may comprise physical pages 341, 342, 343, 344.

Memory map 330 illustrates an interleaved arrangement of logical pages. Logical page 301 maps to the first physical page (page 341) and logical page 302 maps to the third physical page (page 343). Logical page 311 maps to the second physical page (page 342) and logical page 312 maps to the fourth physical page (page 344). Thus, in certain embodiments the logical pages of PANEL1 map to the first, third, etc. physical pages while the logical pages of PANEL2 map to the second, fourth, etc. physical pages.

Figure 4:
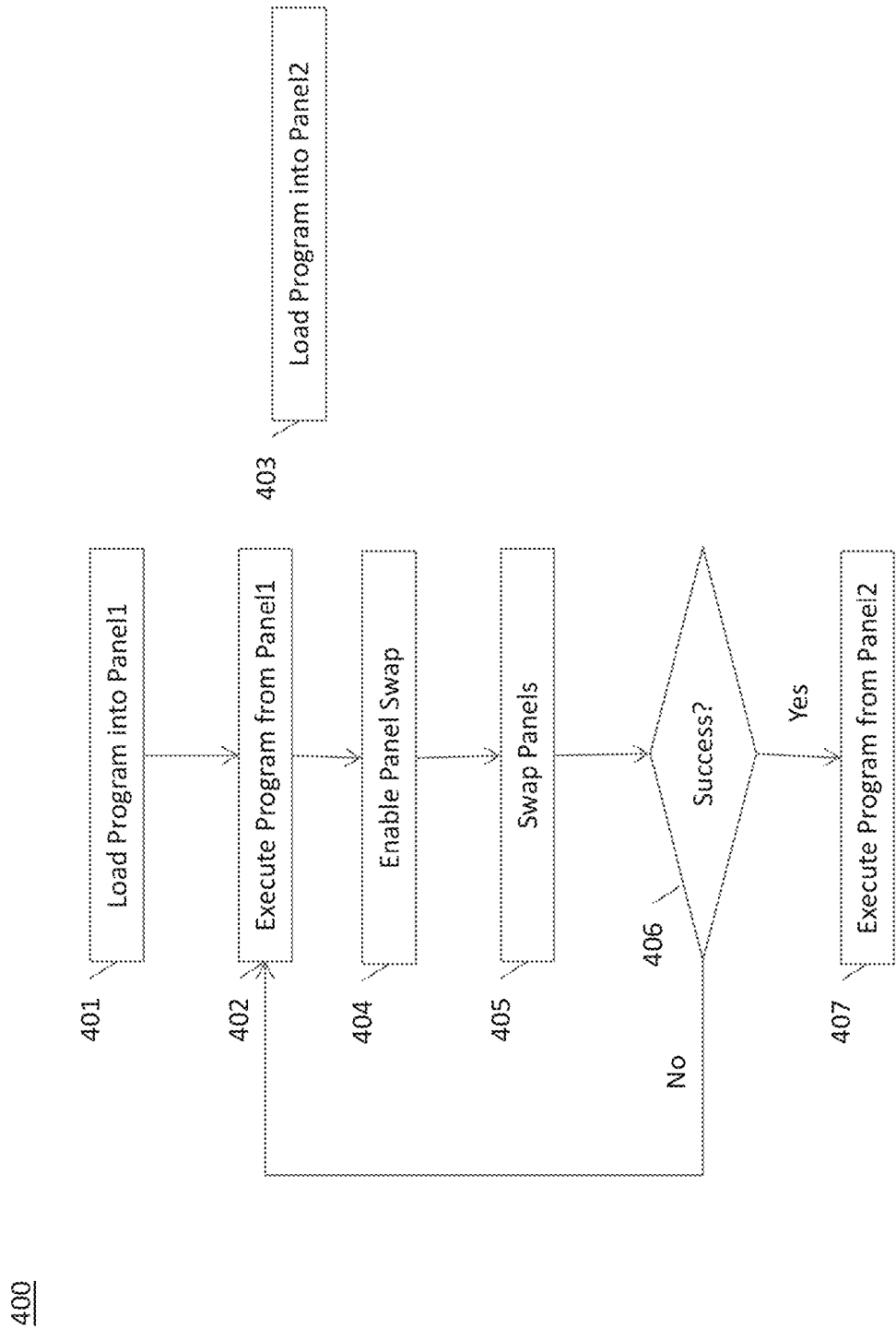
FIG. 4 illustrates a method of performing a memory swap, according to certain embodiments.

FIG. 4 illustrates a method for performing a memory swap, according to certain embodiments. Method 400 comprises steps 401-407, each of which is described below in more detail. Method 400 comprises generally serially executed steps 401, 402, 404, 405, 406, and 407 as well as parallel step 403.

In step 401, an application program may be loaded into Panel1. Step 401 may be performed by microcontroller 101 executing an initialization routine, for example, from test area 220. Step 401 may be performed by programmer 104.

In step 402, microcontroller 101 executes the application program loaded into Panel1. The application program may, for example, be a motor controller program that reads inputs from peripheral devices and determines a motor control output signal based at least in part on those inputs. While microcontroller 101 executes the application program from Panel1, step 403 may be performed.

In step 403, a second application program may be loaded into Panel2. Step 403 may be performed by microcontroller 101 operating in a multi-processing mode. Step 403 may be performed by programmer 104. Step 403 may complete before step 404 commences to ensure that a complete program is available in Panel2 before attempting to swap panels.

In step 404, microcontroller 101 may execute one or more instructions to enable the panel swap functionality. This sequence of one or more instructions may prevent a program from accidentally swapping panels as the result of programming or compiling errors. In certain embodiments, step 404 involves sequentially writing two pre-determined values to a specified memory location within a pre-determined window of time.

In step 405, microcontroller 101 may execute an instruction containing an operation code (i.e., an OPCODE) specifying a panel swap operation. In step 405, microcontroller 101 may alter a status register value to change the active panel to a previously inactive panel, e.g., Panel2 that was loaded with the second application in step 403. In certain embodiments, the activation of Panel2 may persist even if microcontroller 101 is subsequently reset or powered off. In certain embodiments, the activation of Panel2 may revert to Panel1 on the occurrence of a subsequent reset, power cycle, or execution of steps 404 and 405. In certain embodiments, the panel swap operation requires an operand of the logical panel number to support more than two logical memory panels.

In step 406, microcontroller 101 may determine whether the panel swap operation was successful in step 405. If yes, microcontroller 101 may proceed to execute step 407. If not, microcontroller 101 may proceed to execute step 402, thereby returning to the program in the still active panel, e.g., Panel1.

In certain embodiments, step 405 must immediately follow the execution of step 404 to prevent accidental execution of the panel swap operation. In certain embodiments, a specified number of instructions (or instruction cycles) may be allowed and/or required between step 405 and step 406. For example, instructions may save the current register state and/or restore a previous register state. In this way, the panel swap operation may be used to implement a context switch allowing the use of microcontroller 101 to allow multiprocessing (e.g., virtual parallel processing).

In certain embodiments, method 400 may be reversible such that steps 401 and 402 operate on Panel2 and steps 403 and 407 operate on Panel1.

FIG. 5 illustrates application source code for invoking the memory swap operation, according to certain embodiments. Listing 500 comprises instruction sequences 501 and 505, each stored in a different panel. Instruction sequence 502 may perform the steps required to enable the panel swap instruction. Instruction sequence 503 may perform the panel swap instruction. Instruction sequence 504 may branch to the entry point of instruction sequence 505 in the event that instruction sequence 503 executes successfully. Label 506 marks the entry point into instruction sequence 505.

Instruction sequence 502 may be a predetermined sequence of steps designed to signal a programmer's intent to perform a panel swap. This sequence may unlock a software interlock to ensure that the panel swap sequence is not executed in error. In certain embodiments, microprocessor 101 executing instruction sequence 502 stores a first constant value in register W0, writes the first constant value to a specified address, stores a second constant value in register W0, and then writes the second constant value to the specified address. Instruction sequence 503 comprises the BOOTSWP instruction.

Execution of the instruction sequence 503 (e.g., the BOOTSWP instruction in certain embodiments) may be subject to a software interlock. If successfully executed, microcontroller 101 may set a status flag (e.g., NVMCON.SOFTSWAP). Microcontroller 101 may also fetch instruction sequence 504 from the currently active panel before performing necessary state changes to activate a previously inactive logical panel. Once the panel swap operation is complete, microcontroller 101 may execute instruction sequence 504 to transfer program control to target 506 in instruction sequence 505. Instruction sequence 504 may be a single word program flow change instruction (PFC).

If not successfully executed, microcontroller may treat the BOOTSWP instruction as a two cycle functional NOP (i.e., incrementing the program counter twice but changing no other program-accessible state). In this circumstance, microcontroller 101 may continue executing instruction sequence 501.

Upon a successful image swap, the PFC target will be in the newly Active panel. PFC target must be present in both code images (in case image swap fails). Code uses SOFTSWAP to determine if image swap was successful or not. When only a software swap occurs, device configuration is not refreshed since the typical reset sequence does not occur.

Persistent boot sequence values may be changed before or after such a BOOTSWP instruction (i.e., in the original or new code image) depending upon application requirements.

FIG. 6 describes a status bit in a special function register, according to certain embodiments. This status bit, labeled SOFTSWAP, may be bit 11 of the non-volatile memory control register, labeled NVMCON. SOFTSWAP may be a readable bit that may be read as a logical '1' if memory panels have been successfully swapped using the BOOTSWP instruction. SOFTSWAP may be a logical '0' otherwise. In certain embodiments microcontroller 101 may be configurable to operate with only one logical panel (e.g., a single boot mode).

FIG. 7 describes a status bit in a special function register, according to certain embodiments. This status bit, labeled P2ACTIV, may be bit 10 of the NVMCON register. If set to logical '0', P2ACTIV may indicate that logical Panel1 is active. If set to logical '1', P2ACTIV may indicate that logical Panel2 is active.

FIG. 8 describes a control/status bit in a special function register, according to certain embodiments. This control/status bit, labeled SWAPEN, may be bit 09 of the NVMCOM register. The SWAPEN may be a control bit in some embodiments and may require sequential writes within a predetermined window of time to be set. In certain embodiments, the SWAPEN bit must be written with a logical '1' twice in three cycles of microcontroller 101 to avoid inadvertently setting this bit.

In certain embodiments SWAPEN may be a dual function control/status bit. In one mode of operation, the SWAPEN bit may be a control bit until it is successfully set (e.g., after the second bit set operation. Once successfully set, the SWAPEN bit may become a status bit indicating whether the BOOTSWP instruction executed within the interlock window. If the BOOTSWP operation is successful, the SWAPEN bit may be cleared (and the P2ACTIV bit may be toggled). If the BOOTSWP operation was not successful, the SWAPEN bit may remain set (and the P2ACTIV bit may not be toggled). In some embodiments, the application program must clear the SWAPEN bit prior to any subsequent attempts to swap logical panels.

Where microcontroller 101 is configured to operate in a single boot mode, SOFTSWAP and P2ACTIVE may be read as a logical '0'. When microcontroller 101 is configured to operate in a dual moot mode, it is used as part of the interlock sequence for the BOOTSWP instruction that co-ordinates the Dual Boot Softswap operation. To help reduce the chance of inadvertently setting the SWAPEN bit, according to some embodiments it must be written twice with a logic '1'. According to a further embodiment, the second write must occur within 2 cycles of the completion of the first write to successfully set the bit. The bit will read as a logic '0' up until that point. Failure to meet write timing will reset the bit cycle count sequencer, as will clearing the bit.

According to certain embodiments, a Interlock Control register (NVMKEY) may be used to enable panel swap functionality. In these embodiments, the BOOTSWP instruction may be enabled only when the interlock sequence is satisfied. The unlock sequence may be the same as that used to allow enable programming and/or erasure of flash memory. The unlock sequence may include setting the NVMCON.WR twice in quick succession. In some embodiments, this software interlock requires application code to write 0x55 followed by 0xAA to the NVMKEY register where the second write must occur 2 cycles after of the completion of the first write to successfully enable the BOOTSWAP. Successfully meeting the write timing may open a 1 instruction cycle window during which the BOOTSWP instruction may be executed. Failure to meet the write timing may reset the NVMKEY sequencer, forcing the unlock sequence to be restarted. The NVMKEY register may always be read as 0.

The NVMCON.SOFTSWAP bit may be a status bit indicating that the BOOTSWP instruction was executed within the interlock window. If the operation is successful, the NVMCON.SOFTSWAP bit may be set (and the P2ACTIV bit may be toggled). If the operation was not successful, the NVMCON.SOFTSWAP bit may retain its previous value (and the P2ACTIV bit may not be toggled). The NVMCON.SOFTSWAP status bit may be cleared by writing a logical '0', but it may not be set directly by application code. Application code may need to clear the NVMCON.SOFTSWAP bit prior to any subsequent Dual Boot Softswap operation attempts so that the status does not reflect a prior successful SOFTSWAP operation.

In these embodiments, the following sequence may successfully unlock the BOOTSWP interlock:

```
MOV.b    #55, W0
MOV.b    WREG, NVMKEY
MOV.b    #AA, W0
MOV.b    WREG, NVMKEY
BOOTSWP            --the bootswap instruction may be executed here.
```

According to some embodiments, microcontroller 101 will support an instruction with mnemonic BOOTSWP that may be executed after successful completion of an interlock sequence. When BOOTSWP is successfully executed, microcontroller 101 may:

Switch Active and Inactive panels within the PS memory map,

Toggle the NVMCON.P2ACTIV bit, and

Set the NVMCON.SOFTSWAP status bit, indicating a softswap has successfully occurred.

According to some embodiments, the BOOTSWP instruction must be followed by a flow control instruction that targets the start of code in the (new) Active panel. This flow control instruction may have a side-effect of flushing the CPU pipeline. Panel swap timing will be such that the panels will swap within PS at the start of the target address pre-fetch.

According to some embodiments, a Softswap will not reload the configuration registers, so those of the original Active panel will persist after the panel swap completes. Reloading configuration registers during a panel swap may further delay execution.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

What is claimed is:

1. A central processing unit with dual boot capabilities, comprising:

an instruction memory comprising a first and second memory area which are configured to be individually programmable, wherein first and second memory area can be assigned to an active memory from which instructions are executed and an inactive memory, respectively;

wherein the instruction set for the central processing unit comprises a opcode, the sole purpose of the opcode to cause a swap from the an active memory area to an inactive memory area, wherein the swap is performed by executing the opcode in the active memory immediately followed by a program flow change instruction in the active memory, whereupon the inactive memory becomes the new active memory and the active memory becomes the new inactive memory and execution of instructions continues in the new active memory.

2. The central processing unit according to claim 1, wherein the program flow change instruction is a branch or jump instruction.

3. The central processing unit according to claim 1, further comprising a control register comprising at least one status bit which is set when said opcode has been successfully executed.

4. The central processing unit according to claim 3, wherein the opcode acts as a no operation instruction when a swap cannot be successfully performed, wherein the no operation instruction advances a program counter to skip the program flow change instruction.

5. The central processing unit according to claim 1, further comprising a control register comprising at least one control bit which must be set to allow a swap from the active memory to the inactive memory.

6. The central processing unit according to claim 5, wherein the at least one control bit is set by setting said control bit at least twice within a predetermined time window.

7. The central processing unit according to claim 6, wherein the time window is 2 instruction cycles.

8. The central processing unit according to claim 1, wherein the inactive memory is configured to be programmable while a program is executed from the active memory.

9. The central processing unit according to claim 1, wherein during initialization, the central processing unit is configured to assign the first memory area to the active memory based at least in part on a panel select value read from nonvolatile memory.

10. The central processing unit according to claim 9, wherein the panel select value in nonvolatile memory is modified as a result of successful execution of the opcode.

11. The central processing unit according to claim 9, wherein the panel select value in nonvolatile memory is modifiable by a software instruction subsequent to successful execution of the opcode.

12. The central processing unit according to claim 1, further comprising a control register configured to enable or disable said opcode.

13. The central processing unit according to claim 12, wherein to allow execution of the opcode the control register must be written with a first value followed by a second value within a predetermined time window, wherein the second value is a digital value inverse to the first value.

14. The central processing unit according to claim 13, wherein the time window is 2 instruction cycles.

15. The central processing unit according to claim 3, further comprising the step of enabling said opcode to be executable only after said at least one status bit in the control register has been cleared.

16. The central processing unit according to claim 15, wherein said at least one status bit in the control register cannot be set by an instruction.

17. A method of operating a central processing unit with dual boot capabilities, comprising:
providing an instruction memory with a first and second memory area which are configured to be individually programmable;
assigning the first memory area to be an active memory from which instructions are executed and the second memory are to an inactive memory, wherein the central processing unit comprises an instruction set that includes a opcode, the sole purpose of the opcode when executed is to cause a swap from the first memory area to the second memory area, wherein the opcode is configurable to be executable or not executable;
configuring the opcode to be executable;
executing the opcode in the active memory followed by a program flow change instruction in the active memory, whereupon execution of the instructions the inactive memory becomes the new active memory and the active memory becomes the new inactive memory and execution of instructions continues in the new active memory.

18. The method according to claim 17, wherein the program flow change instruction is a branch or jump instruction.

19. The method according to claim 17, further comprising the step of automatically setting at least one status bit in a control register when said opcode has been successfully executed.

20. The method according to claim 19, further comprising the step of enabling said opcode to be executable only after said at least one status bit in the control register has been cleared.

21. The method according to claim 20, wherein said at least one status bit in the control register cannot be set by an instruction.

22. The method according to claim 20, wherein the opcode acts as a no operation instruction when the opcode is not enabled, wherein the no operation instruction advances a program counter to skip the program flow change instruction.

23. The method according to claim 17, further comprising the step of setting a control bit in a control register before executing the opcode wherein setting the control bit enables execution of the opcode.

24. The method according to claim 23, further comprising setting the at least one control bit at least twice within a predetermined time window before executing the opcode whereupon execution of the opcode is enabled.

25. The method according to claim 24, wherein the predetermined time window is 2 instruction cycles long.

26. The method according to claim 17, further comprising the step of programming the inactive memory while a program is executed from the active memory.

27. The method according to claim 17, wherein during initialization, the central processing unit assigns the first memory area to the active memory based at least in part on a panel select value read from nonvolatile memory.

28. The method according to claim 27, wherein the panel select value in nonvolatile memory is modified as a result of successful execution of the opcode.

29. The method according to claim 27, wherein the panel select value in nonvolatile memory is modifiable by a software instruction subsequent to successful execution of the opcode.

30. The method according to claim 17, further comprising the step of writing a first value to a control register and subsequently writing a second value to the control register within a predetermined time window to enable said opcode, wherein the second value is a digital value inverse to the first value.

31. The method according to claim 30, wherein the time window is 2 instruction cycles.

32. A central processing unit with dual boot capabilities, comprising:
an instruction memory comprising a first and second memory area which are configured to be individually programmable, wherein first and second memory area can be assigned to an active memory from which instructions are executed and an inactive memory, respectively;
wherein the instruction set for the central processing unit comprises an instruction having an opcode, the sole purpose of the opcode to perform a swap from an active memory area to an inactive memory area, wherein the opcode is configurable to be executable or not executable, wherein the swap is performed by configuring the instruction to be executable and subsequently executing the opcode in the active memory immediately followed by a program flow change instruction in the active memory, whereupon the inactive memory becomes the new active memory and the active memory becomes the new inactive memory and execution of instructions continues in the new active memory.

\* \* \* \* \*